(No Model.) 2 Sheets—Sheet 1.
F. E. KIRBY.
STEERING GEAR FOR SHIPS.
No. 582,931. Patented May 18, 1897.
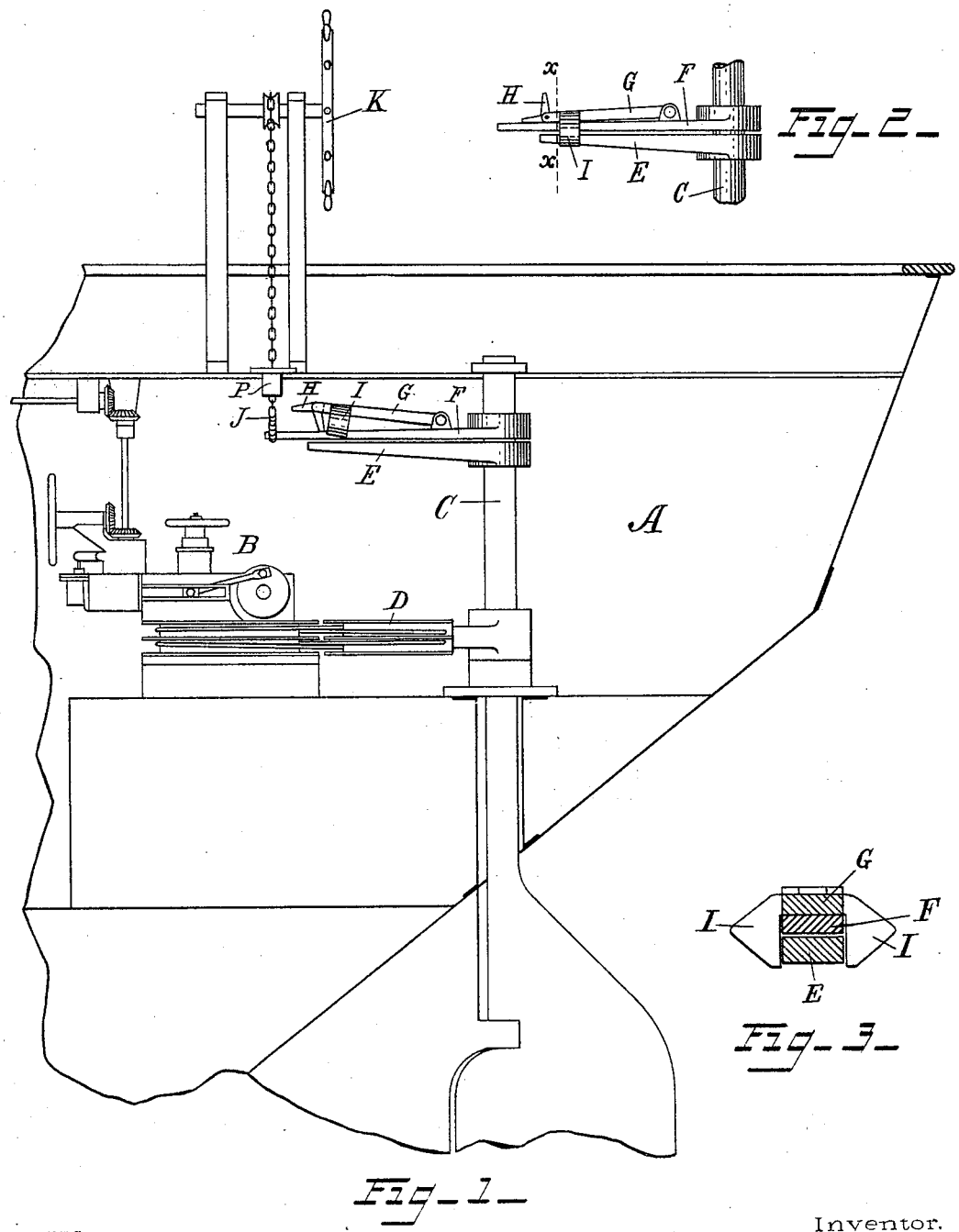
Witnesses: Inventor.

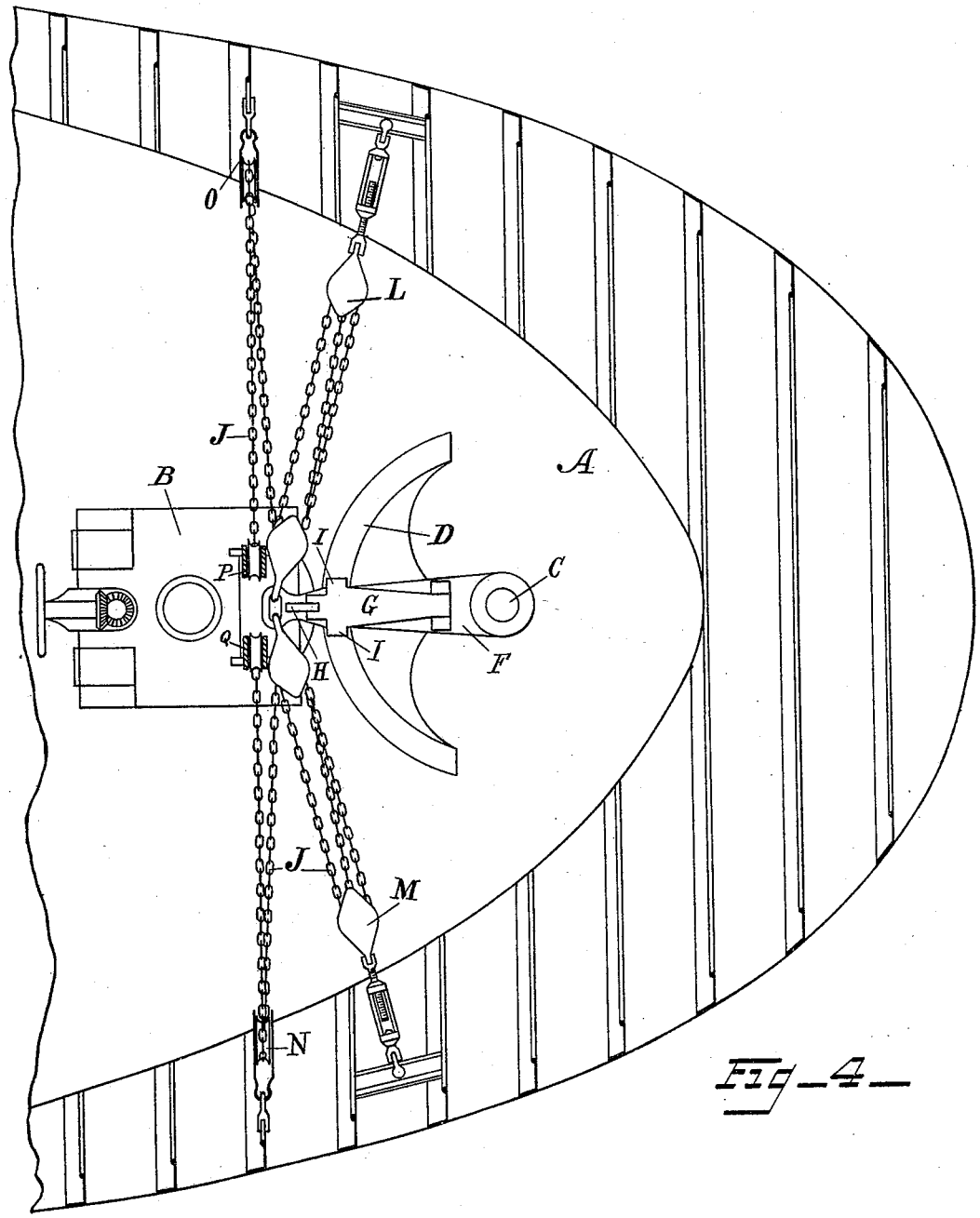

UNITED STATES PATENT OFFICE.

FRANK E. KIRBY, OF DETROIT, MICHIGAN, ASSIGNOR TO THE DETROIT DRY DOCK COMPANY, OF SAME PLACE.

STEERING-GEAR FOR SHIPS.

SPECIFICATION forming part of Letters Patent No. 582,931, dated May 18, 1897.

Application filed December 24, 1896. Serial No. 616,874. (No model.)

*To all whom it may concern:*

Be it known that I, FRANK E. KIRBY, of Detroit, in the county of Wayne and State of Michigan, have invented a new and useful Improvement in Steering-Gear for Ships, of which the following is a specification.

My invention consists in an improvement in steering-gear for ships, hereinafter fully described and claimed.

Figure 1 is a side elevation; Fig. 2, an elevation of the fast and loose tiller with the locking device. Fig. 3 is a section on line $x\,x$, Fig. 2; and Fig. 4 is a top plan view.

A represents the stern of a ship.

C represents a rudder-stock, and B represents an engine for turning the rudder-stock by steam-power, these being substantially such as are shown in my application, Serial No. 585,934, filed April 2, 1896.

It is always important to have hand steering-gear in connection with a steam steering-gear and so arranged that it can be quickly connected for service, and no part of it should be connected with and move with the steam-gear whereby it would suffer wear and tear when steering by steam-gear. As usually fitted, some parts of both steam and hand gear are common to each other, and the breaking of such parts disables both gears. I obviate this difficulty by so arranging the hand steering-gear that it is detached from the rudder-stock when the ship is being steered by steam, but may be very quickly and readily connected with the rudder if any accident happens to the steam steering-gear, and in this way the hand steering-gear receives no wear except when it is in actual use.

E represents a tiller rigidly secured to the rudder-stock C.

F represents a tiller loosely sleeved on the rudder-stock and at its outer end connected with the usual rope or chain J and blocks L, M, N, and O and leading to a wheel and barrel K, which is usually placed in the forward part of the ship, though it is shown in the drawings, for the sake of economizing space, as above the tiller.

G represents an arm pivoted at one end to the tiller F and having pivoted in its other end a bell-crank lever H, which, when in the position shown in Fig. 1, holds said arm G raised, because one arm of the lever H rests in a bracing position upon the top of tiller F, but when thrown into another position, as shown in Fig. 2, permits the free end of the arm G to drop down upon the top of the tiller F.

I represents a yoke fastened to arm G and adapted to span tillers F and E, so that when arm G is dropped, as shown in Fig. 2, yoke I will span tillers F and E, as shown in Fig. 3, locking them together and force said tillers to move in unison, while when in the position shown in Fig. 1 the fixed tiller E may move freely with the rudder-stock without in any way affecting the tiller F, and vice versa. The athwartship edges of the yoke are beveled, as shown in Fig. 3, so it will automatically engage and connect both tillers at any point swept by their movement.

The operation of my invention is as follows: In the arrangement shown in Fig. 1 the ship is to be steered by the engine B and a quadrant D on the rudder-stock, and the arm G is kept raised, so that the tillers F and E are not connected. The operation of steering the ship is entirely independent of the hand steering arrangement K, and there is no wear on the ropes J or the blocks through which they pass. If now the steam steering-gear becomes disabled, the bell-crank lever H is tripped, so that arm G falls and yoke I connects the two tillers F and E, and in this position the ship may be steered by hand through the wheel K, wherever located. It is also desirable to provide means for disconnecting engine B from the rudder, and means for doing this are shown in my former application.

What I claim as my invention, and desire to secure by Letters Patent, is—

1. The combination with a rudder-stock and a steam steering-gear adapted to operate the same, of a tiller secured to said stock, a tiller loosely sleeved on said stock, a locking device on the loose tiller adapted to automatically connect the two tillers together, means substantially such as described for holding said locking device out of engagement, and a hand steering-gear connected with the loose tiller, substantially as shown and described.

2. The combination with a rudder-stock, and a steam steering-gear for operating the same, of two tillers, one rigidly secured to and the other loosely mounted upon the rudder-stock, an arm pivoted to the loosely-mounted tiller and provided with a yoke for engaging the rigidly-secured tiller, and a lever for holding the yoke-carrying arm in position to free the yoke from engagement with the rigidly-secured tiller, substantially as described.

3. The combination with a rudder-stock, and a steam steering-gear for operating the same, of two tillers, one rigidly secured to and the other loosely mounted upon the rudder-stock, an arm pivoted to the loosely-mounted tiller and provided with a pendent yoke to embrace the rigidly-secured tiller, and a lever pivoted to said arm for holding it elevated with the yoke disengaged from the rigidly-secured tiller, substantially as described.

FRANK E. KIRBY.

Witnesses:
DAVID T. MARANTETTE,
AMELIA J. WILLIAMS.